United States Patent
Omori

(10) Patent No.: US 11,867,226 B2
(45) Date of Patent: Jan. 9, 2024

(54) THRUST FOIL BEARING AND METHOD FOR MANUFACTURING BASE PLATE OF THRUST FOIL BEARING

(71) Applicant: IHI CORPORATION, Tokyo (JP)

(72) Inventor: Naomichi Omori, Tokyo (JP)

(73) Assignee: IHI CORPORATION, Tokyo (JP)

( * ) Notice: Subject to any disclaimer, the term of this patent is extended or adjusted under 35 U.S.C. 154(b) by 100 days.

(21) Appl. No.: 17/417,692

(22) PCT Filed: Dec. 10, 2019

(86) PCT No.: PCT/JP2019/048252
§ 371 (c)(1),
(2) Date: Jun. 23, 2021

(87) PCT Pub. No.: WO2020/137513
PCT Pub. Date: Jul. 2, 2020

(65) Prior Publication Data
US 2022/0120314 A1    Apr. 21, 2022

(30) Foreign Application Priority Data

Dec. 25, 2018  (JP) .................................. 2018-241532

(51) Int. Cl.
*F16C 17/04*    (2006.01)

(52) U.S. Cl.
CPC .................................. *F16C 17/042* (2013.01)

(58) Field of Classification Search
CPC .................................................. F16C 17/042
See application file for complete search history.

(56) References Cited

U.S. PATENT DOCUMENTS

| 4,597,677 A | * | 7/1986 | Hagiwara | ............. | F16C 17/042 |
|---|---|---|---|---|---|
| | | | | | 384/106 |
| 4,624,583 A | | 11/1986 | Saville et al. | | |
| 10,138,934 B2 | * | 11/2018 | Omori | ..................... | F16C 27/02 |
| 2002/0106138 A1 | | 8/2002 | Akizuki et al. | | |
| 2003/0169951 A1 | | 9/2003 | Nishijima | | |
| 2004/0179759 A1 | | 9/2004 | Katou et al. | | |
| 2008/0260308 A1 | | 10/2008 | Struziak et al. | | |
| 2011/0103725 A1 | | 5/2011 | Omori | | |
| 2015/0330443 A1 | | 11/2015 | Omori | | |

(Continued)

FOREIGN PATENT DOCUMENTS

| CN | 103291745 A | 9/2013 |
|---|---|---|
| CN | 104937291 A | 9/2015 |

(Continued)

OTHER PUBLICATIONS

He Huan-yuan et al., "Characteristic Research on Pressure Fields of Separation-type Bump Foil Hydrodynamic Thrust Bearings", Machine Building & Automation, vol. 44, No. 2, pp. 4-6, Feb. 2015.

(Continued)

*Primary Examiner* — James Pilkington

(57) ABSTRACT

A base plate of a thrust foil bearing is provided with a plurality of protrusions and a plurality of recesses formed alternately in a first direction in a striped manner, and either one of top surfaces of the plurality of protrusions and bottom surfaces of the plurality of recesses gradually lower toward one side in the first direction.

5 Claims, 8 Drawing Sheets

(56) References Cited

U.S. PATENT DOCUMENTS

| | | |
|---|---|---|
| 2016/0195128 A1 | 7/2016 | Omori |
| 2016/0319859 A1 | 11/2016 | Omori |
| 2018/0126433 A1 | 5/2018 | Ogawa et al. |
| 2018/0156267 A1 | 6/2018 | Luo |
| 2018/0291950 A1 | 10/2018 | Park et al. |
| 2019/0039259 A1 | 2/2019 | Imai |

FOREIGN PATENT DOCUMENTS

| | | | |
|---|---|---|---|
| CN | 105402251 A | | 3/2016 |
| CN | 105683598 A | | 6/2016 |
| CN | 107530751 A | | 1/2018 |
| CN | 108253013 A | | 7/2018 |
| CN | 108286567 A | | 7/2018 |
| CN | 108698247 A | | 10/2018 |
| EP | 0 182 535 A1 | | 5/1986 |
| EP | 2 910 802 A1 | | 8/2015 |
| EP | 3 258 125 A1 | | 12/2017 |
| GB | 1077142 A | | 7/1967 |
| JP | S58-160619 A | | 9/1983 |
| JP | S60-088216 A | | 5/1985 |
| JP | S61-140217 U | | 8/1986 |
| JP | S63-195412 A | | 8/1988 |
| JP | 2001-227535 A | | 8/2001 |
| JP | 2002-195257 A | | 7/2002 |
| JP | 2003-113837 A | | 4/2003 |
| JP | 2003-262222 A | | 9/2003 |
| JP | 2004-270904 A | | 9/2004 |
| JP | 2006-057652 A | | 3/2006 |
| JP | 2009-299748 P | | 12/2009 |
| JP | WO2015/041233 | * | 3/2015 |
| JP | 2015-140909 A | | 8/2015 |
| JP | 6065917 B2 | | 1/2017 |
| KR | 10-1408672 B1 | | 6/2014 |
| WO | 2016/129579 A1 | | 8/2016 |

OTHER PUBLICATIONS

Xie Weisong et al., "Review of Technique Application and Performance Evaluation for Aerodynamic Elastic Foil Gas Bearing in Aero engine", Lubrication Engineering, vol. 43, No. 7, pp. 136-147, Jul. 2018.

China National Intellectual Property Administration, "Notice of Allowance", issued in Chinese Patent Application No. 201980085268.0, which is a counterpart to U.S. Appl. No. 17/417,692, dated Nov. 23, 2022, 7 pages (2 pages of English translation of Search Report and 5 pages of original Notice of Allowance and Search Report).

* cited by examiner

THRUST FOIL BEARING AND METHOD FOR MANUFACTURING BASE PLATE OF THRUST FOIL BEARING

CROSS REFERENCE TO RELATED APPLICATIONS

This patent application is a U.S. national stage application under 35 U.S.C. § 371 of International Patent Application No. PCT/JP2019/048252 filed on Dec. 10, 2019, which claims the benefit of foreign priority to Japanese Patent Application No. JP 2018-241532 filed on Dec. 25, 2018, the content of which is incorporated herein by reference. The International Application was published in Japanese on Jul. 2, 2020, as International Publication No. WO 2020/137513 A1 under PCT Article 21(2).

TECHNICAL FIELD

The present disclosure relates to a thrust foil bearing and a method for manufacturing a base plate of a thrust foil bearing.

BACKGROUND

Conventionally, as a bearing for a high-speed rotating body, a thrust foil bearing that is disposed to face a thrust collar provided on a rotary shaft is known (refer to, for example, Patent Document 1 below). The bearing surface of the thrust foil bearing is formed of a flexible foil (thin metal plate) in order to be able to absorb the movement of the rotary shaft (the axial direction movement and inclination of the thrust collar) caused by vibration or impact, and the thrust foil bearing has a foil structure under the bearing surface in order to flexibly support the bearing surface.

A thrust foil bearing has a configuration in which a plurality of top foil pieces and a plurality of back foil pieces are arranged in the circumferential direction. The top foil piece is supported by the back foil piece, and the rotation of the thrust collar causes lubricating fluid to flow into a gap between the top foil piece and the thrust collar. The lubricating fluid forms a wedge-shaped fluid lubrication film between the top foil piece and the thrust collar, and the load capacity of the thrust foil bearing is obtained.

DOCUMENT OF RELATED ART

Patent Document

[Patent Document 1] Japanese Patent No. 6065917

SUMMARY

Technical Problem

In the above related art, in order to form a wedge-shaped gap between the top foil and the thrust collar, a back foil having a constant height is disposed on an inclined surface formed on a base plate. However, although such an inclined surface may be formed through cutting or the like, in order to form a desired fluid lubrication film, a certain degree of working accuracy has to be secured, and thus the time and cost needed for working may increase. Therefore, it has been desired to improve the workability of the base plate.

The present disclosure is made in view of the above circumstances, and an object thereof is to improve the workability of the base plate of the thrust foil bearing.

Solution to Problem

An aspect of a thrust foil bearing of the present disclosure includes: a base plate provided with a plurality of protrusions and a plurality of recesses, the plurality of protrusions and the plurality of recesses being formed alternately in a first direction in a striped manner, and either one of top surfaces of the plurality of protrusions and bottom surfaces of the plurality of recesses gradually lowering toward one side thereof in the first direction; and a back foil supported by either one of the top surfaces of the plurality of protrusions and the bottom surfaces of the plurality of recesses of the base plate, the either one gradually lowering toward the one side in the first direction.

In the aspect of the present disclosure, the either one of the top surfaces and the bottom surfaces may be formed into an inclined surface.

In the aspect of the present disclosure, either one of the plurality of protrusions and the plurality of recesses may extend in a second direction crossing the first direction, and protrusions of the plurality of protrusions or recesses of the plurality of recesses, adjacent to each other in the first direction, may be connected together at either one end in the second direction.

An aspect of a method of manufacturing a base plate of a thrust foil bearing of the present disclosure, the base plate being provided with a plurality of protrusions and a plurality of recesses, the plurality of protrusions and the plurality of recesses being formed alternately in a first direction in a striped manner, and either one of top surfaces of the plurality of protrusions and bottom surfaces of the plurality of recesses gradually lowering toward one side in the first direction, includes: forming the plurality of protrusions and the plurality of recesses through press working.

In the aspect of a method of manufacturing a base plate of a thrust foil bearing of the present disclosure, the press working may include: first press working in which the base plate is pressed by a first mold provided with recesses and protrusions on a press surface to form the plurality of recesses and the plurality of protrusions, the top surfaces of the plurality of protrusions having a constant height, and second press working in which after the first press working, the top surfaces of the plurality of protrusions are pressed by a second mold including an inclined press surface to form inclined surfaces gradually lowering toward the one side in the first direction.

Effects

According to the present disclosure, the workability of the base plate of the thrust foil bearing can be improved.

DESCRIPTION OF EMBODIMENTS

Hereinafter, a thrust foil bearing of the present disclosure will be described in detail with reference to the drawings.

Figure 1:
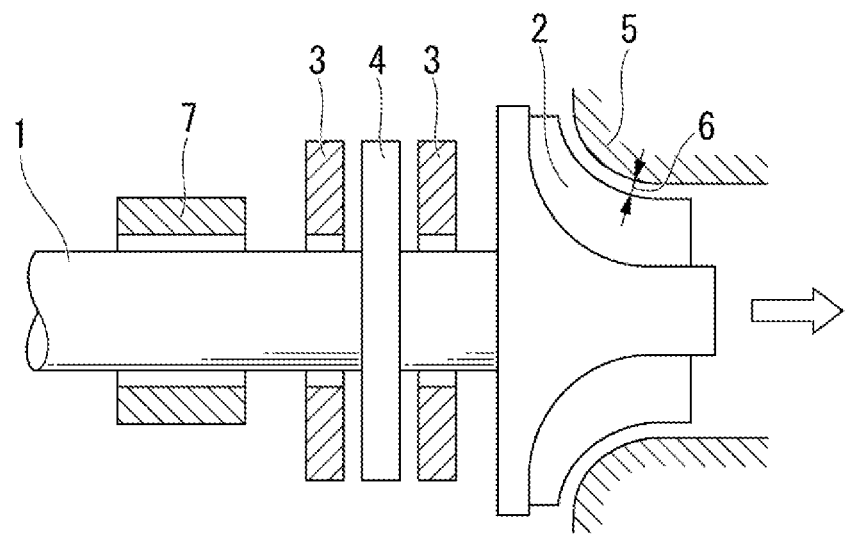
FIG. 1 is a side view showing an example of a turbo machine to which a thrust foil bearing of the present disclosure is applied.

FIG. 1 is a side view showing an example of a turbo machine to which a thrust foil bearing of the present disclosure is applied.

In FIG. 1, a reference sign 1 represents a rotary shaft, a reference sign 2 represents an impeller provided at an end part of the rotary shaft, and a reference sign 3 represents a thrust foil bearing of the present disclosure.

To the rotary shaft 1 is attached a disk-shaped thrust collar 4. The thrust collar 4 is disposed between a pair of thrust foil bearings 3. The impeller 2 is disposed inside a housing 5 that is on a stationary side, and a tip clearance 6 is provided between the impeller 2 and the housing 5. The rotary shaft 1 is supported by a radial foil bearing 7.

Figure 2:
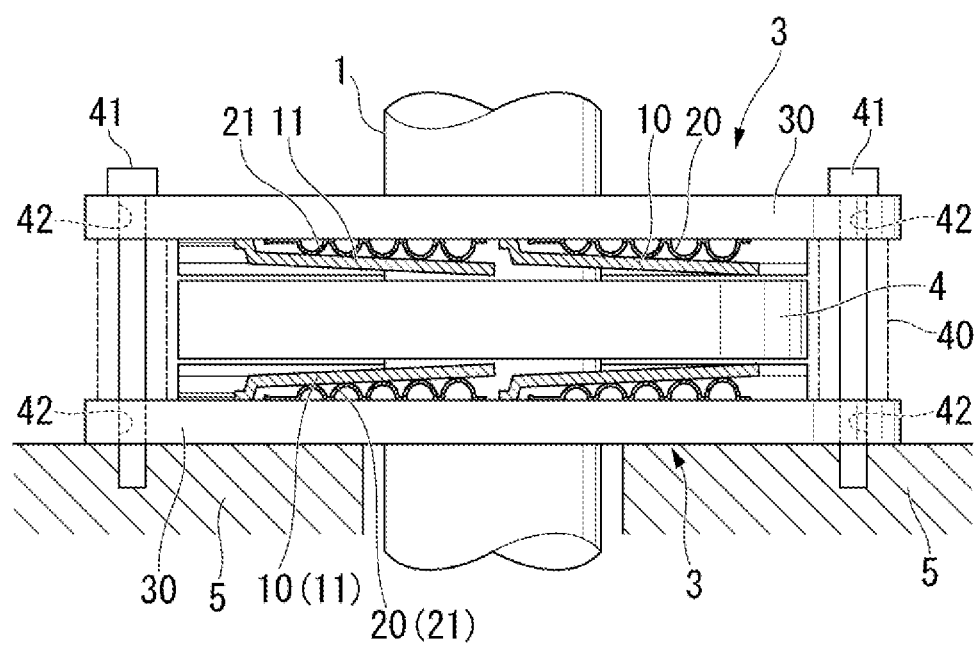
FIG. 2 is a side view showing the thrust foil bearing of the present disclosure.

FIG. 2 is a side view showing the thrust foil bearing 3 of the present disclosure. As shown in FIG. 2, the pair of thrust foil bearings 3 are provided on two sides of the thrust collar 4 so that the thrust collar 4 is disposed therebetween. The pair of thrust foil bearings 3 have an equal configuration. The thrust foil bearing 3 includes a top foil 10, a back foil 20, and a base plate 30.

A cylindrical bearing spacer 40 shown by a dashed double-dotted line is sandwiched between base plates 30 of each of the pair of thrust foil bearings 3. The base plates 30 are connected together by fastening bolts 41 through the bearing spacer 40. The outer periphery of the base plate 30 is provided with through-holes 42 through which the fastening bolts 41 are inserted. Either one of the base plates 30 connected together in this way is in contact with the housing 5 by tightening the fastening bolts 41.

First Embodiment

Figure 3:
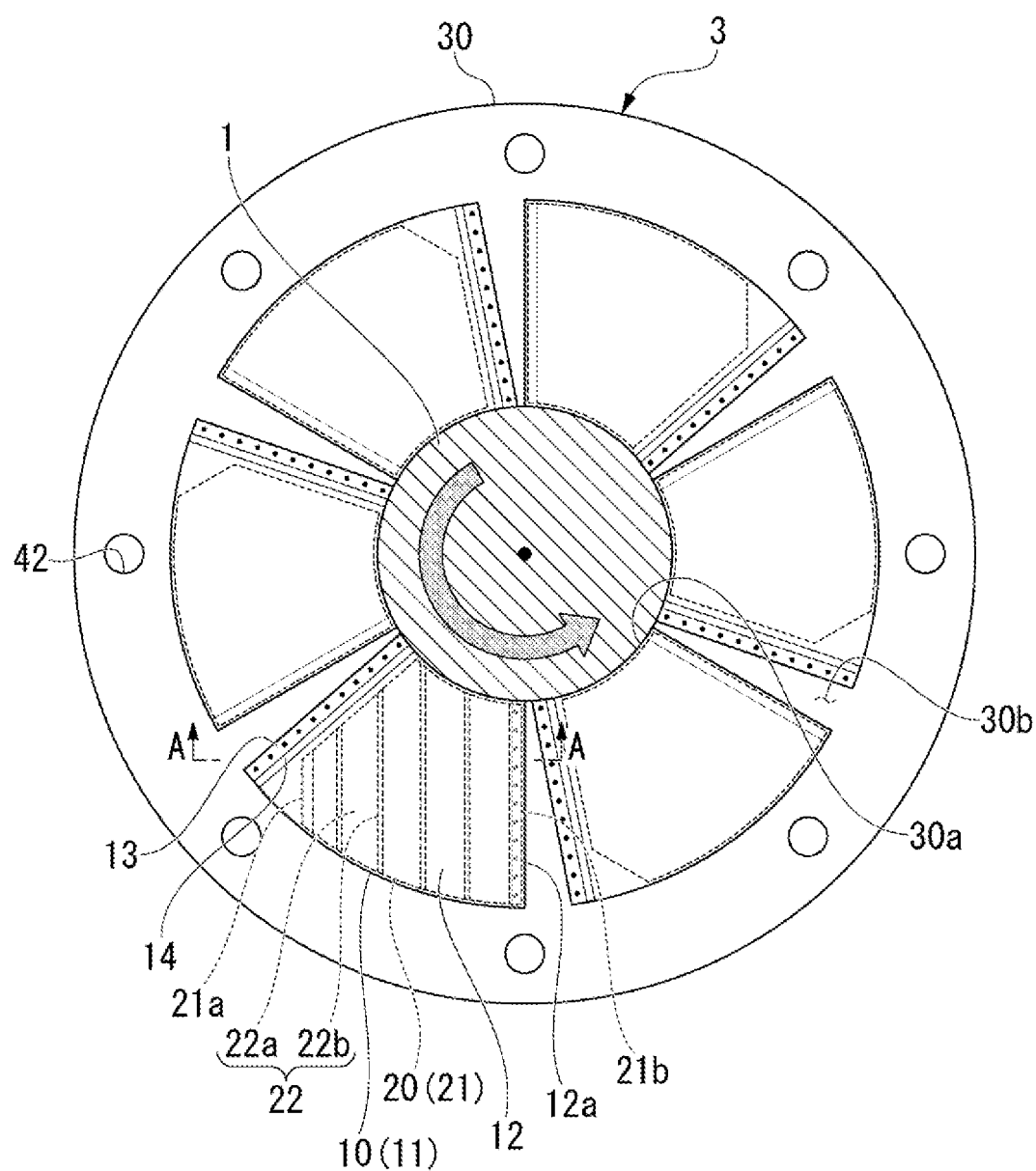
FIG. 3 is a plan view showing a thrust foil bearing of a first embodiment of the present disclosure.
Figure 4:
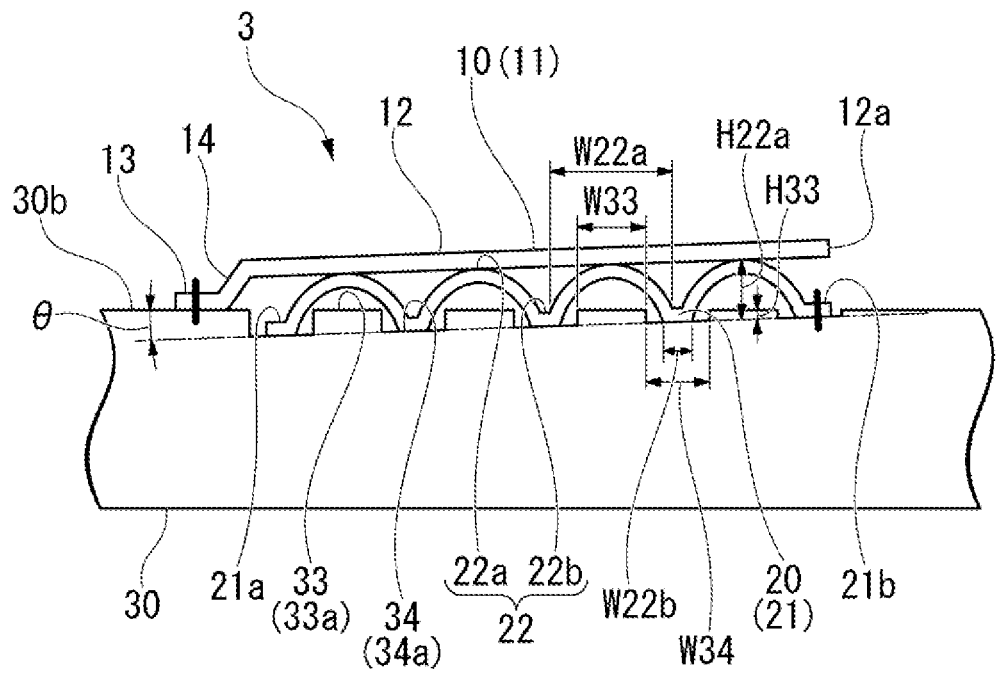
FIG. 4 is a view taken along line A-A and viewed in an arrow direction in FIG. 3.
Figure 5:
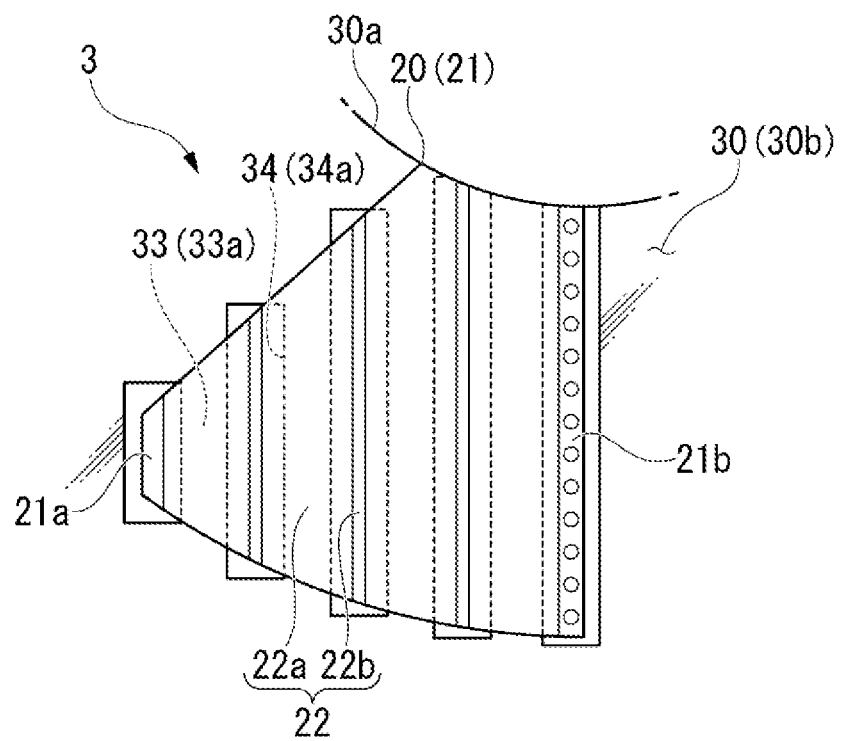
FIG. 5 is a plan view showing a base plate supporting a back foil shown in FIG. 3.

FIG. 3 is a plan view showing a thrust foil bearing 3 of a first embodiment of the present disclosure. FIG. 4 is a view taken along line A-A and viewed in an arrow direction in FIG. 3. FIG. 5 is a plan view showing a base plate 30 supporting a back foil 20 shown in FIG. 3.

As shown in FIG. 3, the base plate 30 includes an insertion hole 30a through which the rotary shaft 1 is inserted.

In the following description, the positional relationship of each member may be described with reference to the insertion hole 30a. Specifically, an "axial direction" refers to a direction in which the insertion hole 30a extends (a direction in which the rotary shaft 1 is inserted). A "radial direction" refers to a radial direction of the insertion hole 30a. A "circumferential direction" refers to a circumferential direction along an inner peripheral surface of the insertion hole 30a. In other words, the radial direction and the circumferential direction can refer to a "radial direction" and a "circumferential direction" with reference to a central axis of the rotary shaft 1 inserted through the insertion hole 30a and as viewed from the central axis.

The base plate 30 forms the outermost part (part on a distant side from the thrust collar) of the thrust foil bearing 3 in the axial direction. The base plate 30 is provided with the insertion hole 30a. That is, the base plate 30 of the present disclosure is a disk-shaped member provided with the insertion hole 30a. However, as long as the insertion hole 30a is provided, the base plate 30 may be a member other than a disk shape (for example, a rectangular plate shape). The insertion hole 30a does not have to have a strict cylindrical shape.

The base plate 30 is formed of, for example, a metal plate having a thickness of about several millimeters. A top foil 10 and the back foil 20 are disposed around the insertion hole 30a (opening) on a flat surface 30b of the base plate 30, and the flat surface 30b is disposed to face the thrust collar 4. Specifically, the top foil 10 is supported by the back foil 20, and the back foil 20 is supported by the base plate 30. That is, the top foil 10 is also supported by the base plate 30 through the back foil 20.

In the present disclosure, the top foil 10 is formed of a plurality (six) of top foil pieces 11, and the back foil 20 is formed of a plurality (six) of back foil pieces 21. The base plate 30 supports the six top foil pieces 11 and the six back foil pieces 21 at regular intervals in the circumferential direction of the flat surface 30b. The number of the top foil pieces 11 and the back foil pieces 21 is not limited to six.

The top foil 10 of the present disclosure is formed of six thin metal plates (the top foil pieces 11) arranged in the circumferential direction. The top foil piece 11 includes an inclined part 12 inclined to extend upward (toward a viewer viewing FIG. 3, or in an axial direction from the base plate 30 toward the top foil piece 11) and in a direction from one side (i.e., the leading side in the rotation direction of the rotary shaft 1) in the circumferential direction toward the other side (i.e., the trailing side in the rotation direction of the rotary shaft 1) in the circumferential direction, and an attachment part 13 connected to the one side in the circumferential direction of the inclined part 12 and attached to the base plate 30.

As shown in FIG. 3, the inclined part 12 is formed into an approximately trapezoidal shape obtained by removing, from a sector shape, an apex side thereof and in which the radially inner side and the radially outer side are each arcuate. That is, the inclined part 12 includes two edges separated from each other in the circumferential direction and extending from the radially inner side to the radially outer side, an inner peripheral edge connecting the two edges on the radially inner side, and an outer peripheral edge connecting the two edges on the radially outer side. The edge (hereinafter, referred to as an end part 12a on the other side in the circumferential direction) being on the other side in the circumferential direction of the inclined part 12 and extending from the radially inner side to the radially outer side is a free end.

On the other hand, the edge being on the one side in the circumferential direction of the inclined part 12 and extending from the radially inner side to the radially outer side is connected to the attachment part 13 through a bent part 14. As shown in FIG. 4, the bent part 14 is formed of a first bend and a second bend positioned on the other side in the circumferential direction of the first bend. The first bend is bent toward an opposite side from a surface of the top foil piece 11 facing the base plate 30. The second bend is bent toward the surface of the top foil piece 11 facing the base plate 30. That is, the bent part 14 has a stepped shape. Both of the first and second bends have obtuse angles.

A portion of the inclined part 12 positioned on the other side in the circumferential direction of the bent part 14 is supported by a support 22 of the back foil piece 21. The portion of the inclined part 12 supported by the support 22 is disposed to be inclined at an initial inclination angle to extend away from the base plate 30 and in a direction from the one side toward the other side in the circumferential direction. The initial inclination angle denotes an inclination angle of the top foil piece 11 with respect to the base plate 30 with no load. The base plate 30 of the present disclosure includes the flat surface 30b extending in a direction orthogonal to the axial direction, and the inclined part 12 is inclined with respect to the flat surface 30b.

The attachment part 13 is connected to the one side (the first bend side) in the circumferential direction of the bent part 14. In the present disclosure, the attachment part 13 is formed into a strip shape having the same length as the bent part 14 in the radial direction and is spot-welded on the base plate 30. That is, the welding position is equal to the attachment position of the top foil piece 11 to the base plate 30. The top foil piece 11 can be attached to the base plate 30 through, for example, screwing other than the spot welding. The attachment part 13 and the bent part 14 do not have to have an equal length in the radial direction.

The back foil 20 is formed of six thin metal plates (the back foil pieces 21) arranged in the circumferential direction. The back foil piece 21 includes the support 22 supporting the inclined part 12 of the top foil piece 11. As shown in FIG. 4, the support 22 is a wavy foil (bump foil) in which hill parts 22a and valley parts 22b are alternately formed. The support 22 elastically supports the inclined part 12 of the top foil piece 11.

For the support 22, for example, a bump foil, a spring foil shown in Japanese Unexamined Patent Application, First Publication No. 2006-57652 or Japanese Unexamined Patent Application, First Publication No. 2004-270904, a back foil shown in Japanese Unexamined Patent Application, First Publication No. 2009-299748, or the like can be used. Although the spring foils shown in Japanese Unexamined Patent Application, First Publication No. 2006-57652 and Japanese Unexamined Patent Application, First Publication No. 2004-270904, and the back foil shown in Japanese Unexamined Patent Application, First Publication No. 2009-299748 are foils used for a radial bearing, when the foils are unfolded into a planar shape and are formed into an annular shape, they can be foils (the support 22) used for the thrust foil bearing 3.

The support 22 of the present disclosure is formed of a bump foil. The support 22 is formed to be slightly smaller than the inclined part 12 of the top foil piece 11 in the plan view shown in FIG. 3. Therefore, the support 22 is covered by the inclined part 12. Similarly to the inclined part 12, the support 22 is formed into an approximately trapezoidal shape obtained by removing, from a sector shape, an apex side thereof and in which the radially inner side and the radially outer side are each arcuate. That is, the support 22 includes two edges separated from each other in the circumferential direction and extending from the radially inner side to the radially outer side thereof, an inner peripheral edge connecting the two edges on the radially inner side, and an outer peripheral edge connecting the two edges on the radially outer side.

An edge (hereinafter, referred to as an end part on the one side in the circumferential direction) being on the one side in the circumferential direction of the support 22 and extending from the radially inner side to the radially outer side is provided with a parallel part (hereinafter, referred to as a back foil end 21a) extending in parallel with an edge (hereinafter, referred to as an end part on the other side in the circumferential direction) being on the other side in the circumferential direction of the support 22 and extending from the radially inner side to the radially outer side. In the support 22, the valley parts 22b and the hill parts 22a are alternately continuously disposed in a first direction from the back foil end 21a toward the end part on the other side in the circumferential direction of the support 22, in other words, in a normal direction (i.e., a direction orthogonal to the ridge line of the hill part 22a) orthogonal to the back foil end 21a and the end part on the other side in the circumferential direction of the support 22.

As shown in FIG. 4, the valley part 22b includes a flat surface and faces the base plate 30. The hill part 22a is formed into an arched part connecting the adjacent valley parts 22b. The back foil piece 21 is supported by the base plate 30. Therefore, the valley part 22b can contact the base plate 30. Two end parts of the support 22, in other words, the back foil end 21a and the end part (hereinafter, referred to as an attachment part 21b) on the other side in the circumferential direction of the support 22, are formed of the valley parts 22b.

In the present disclosure, the valley parts 22b and the hill parts 22a are formed at almost equal intervals. The heights H22a of the hill parts 22a are set to have a constant height. The attachment part 21b is spot-welded to the base plate 30. That is, the welding position is equal to the attachment position of the back foil piece 21 to the base plate 30. Therefore, in the present disclosure, the attachment position of the back foil piece 21 is equal to the valley part 22b (the attachment part 21b) positioned at the end on the other side (right side in FIG. 4) in the first direction.

The valley part 22b (the back foil end 21a) positioned at the end on the one side (left side in FIG. 4) in the first direction of the back foil piece 21 is a free end. That is, when a load acts on the back foil piece 21, the back foil end 21a can move toward the one side in the first direction. The back foil piece 21 can be attached to the base plate 30 through, for example, screwing other than the spot welding.

The base plate 30 is provided with protrusions 33 and recesses 34 disposed alternately in the first direction in a striped manner. The valley parts 22b of the back foil piece 21 are supported by bottom surfaces 34a of the recesses 34. The recess 34 is a portion further depressed toward the distant side from the thrust collar than the flat surface 30b of the base plate 30. The protrusion 33 is a portion protruding toward the thrust collar relative to the bottom surface 34a of the recess 34. Top surfaces 33a of the protrusions 33 are included in the same plane as the flat surface 30b of the base plate 30.

As shown in FIG. 5, the plurality of recesses 34 are formed to be separated from each other in the first direction and in the same number as that of the valley parts 22b. The protrusion 33 has a flat surface formed between the recesses 34 adjacent to each other in the first direction, and the protrusions 33 are formed in the same number as that of the hill parts 22a. The recess 34 extends in the same direction as that of the valley part 22b (i.e., in a second direction orthogonal to the first direction, in other words, in a direction in which the ridge line of the hill part 22a extends). The recess 34 has a length corresponding to the length of the valley part 22b in the second direction. In other words, the recess 34 is formed to be longer in the second direction than the valley part 22b disposed on the bottom surface 34a. That is, the valley part 22b can be accommodated in the recess 34.

As shown in FIG. 4, the bottom surfaces 34a of the recesses 34 gradually lower toward the one side (left side in FIG. 4) in the first direction. Regarding the height relationship thereof, in a case where an axial direction to a surface (top surface) of the base plate 30 provided with the recesses 34 from the back surface thereof is referred to as an axial positive direction, a position further in the axial positive direction is referred to as a higher position. That is, the bottom surface 34a of one recess 34 is closer to the flat surface 30b than the bottom surface 34a of another recess 34 positioned on the one side in the first direction of the one recess 34. Each bottom surface 34a of the recesses 34 of the present disclosure is formed into an inclined surface that is inclined at an angle θ with respect to the flat surface 30b. The magnitude of the angle θ corresponds to the initial inclination angle of the inclined part 12 of the top foil piece 11.

The dimension W34 in the first direction of the recess 34 is greater than the dimension W22b in the first direction of the valley part 22b. The dimension W34 of the recess 34 may be a dimension such that the valley part 22b is prevented from contacting the side surface of the protrusion 33 when the valley part 22b moves in the first direction by the back foil piece 21 being pressed against the base plate 30.

The dimension W33 in the first direction of the protrusion 33 is less than the dimension W22a in the first direction of the hill part 22a. The dimension W33 in the first direction of this protrusion 33 is set such that the sum of the dimension W33 and the dimension W34 in the first direction of the recess 34 corresponds to the interval of the hill parts 22a of the back foil piece 21.

The height H22a of the hill part 22a (a distance in the normal direction of the flat surface 30b between the bottom of the valley part 22b and the top of the hill part 22a if the valley part 22b of the back foil piece 21 is disposed to contact the flat surface 30b of the base plate 30) is greater than the height H33 of the protrusion 33 (a distance between the bottom surface 34a of a lower recess 34 of the recesses 34 adjacent to the protrusion 33 and the most distant part of the protrusion 33 from the bottom surface 34a of the lower recess 34 in the normal direction of the bottom surface 34a). As shown in the present disclosure, in a case where the heights H22a of the hill parts 22a are constant (that is, when the back foil piece 21 is disposed on the flat surface 30b such that the valley part 22b is in contact therewith, distances between the peaks of the hill parts 22a and the flat surface 30b are equal), the height H22a may be set to be greater than the height H33 (the maximum height of the top surface 33a with respect to the bottom surface 34a) of a protrusion 33 disposed to be closest to the one side (left side in FIG. 4) in the first direction. For example, based on the maximum height H33 of the protrusion 33, the height H22a of the hill part 22a may be approximately twice or more the maximum height H33 of the protrusion 33.

Figure 6:
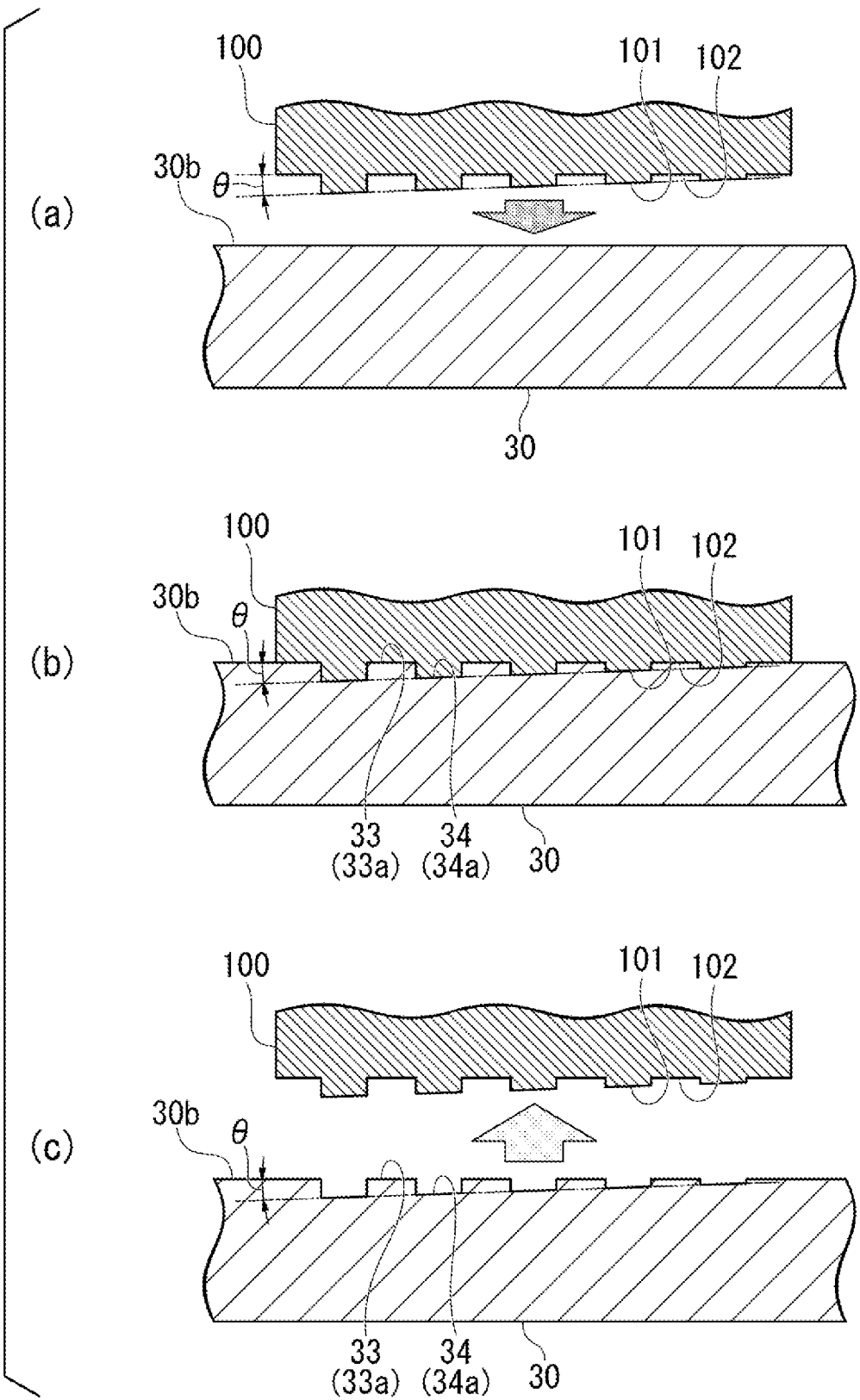
FIG. 6 is a diagram showing a process of forming protrusions and recesses on the base plate of the first embodiment of the present disclosure.

The base plate 30 including the protrusions 33 and the recesses 34 having the above configurations can be formed through, for example, press working as shown in FIG. 6.

FIG. 6 is a diagram showing a process of forming the protrusions 33 and the recesses 34 on the base plate 30 of the first embodiment of the present disclosure.

In the press working in this process, as shown in part (a) of FIG. 6, a mold 100 provided with protrusions 101 and recesses 102 on a press surface thereof may be used.

The mold 100 is provided with a plurality of protrusions 101 and a plurality of recesses 102 alternately disposed in the first direction (the left-right direction in FIG. 6) on the press surface thereof. The extending amount of the facing surfaces of the plurality of protrusions 101 toward the flat surface 30b of the base plate 30 gradually increases toward the one side (left side in FIG. 6) in the first direction. The facing surface of each protrusion 101 forms an inclined surface of the angle θ. On the other hand, the recess 102 includes a flat surface parallel to the flat surface 30b.

As shown in part (b) of FIG. 6, the flat surface 30b of the base plate 30 is pressed using the mold 100. Through the press working, the shapes of the protrusions 101 and the recesses 102 of the mold 100 are transferred to the flat surface 30b of the base plate 30 to form the recesses 34 and the protrusion 33 thereon, respectively.

Thereby, as shown in part (c) of FIG. 6, the flat surface 30b of the base plate 30 can be provided with the plurality of recesses 34 including the bottom surfaces 34a (inclined surfaces) inclined at the angle θ with respect to the flat surface 30b, and the plurality of protrusions 33 being between the recesses 34 and including the top surfaces 33a (flat surfaces) not inclined with respect to the flat surface 30b.

Next, the operation of the thrust foil bearing 3 provided with the base plate 30 having such a configuration will be described.

As shown in FIG. 2, the thrust foil bearing 3 is provided on each of two sides of the thrust collar 4 such that the thrust collar 4 is disposed therebetween. Therefore, it is possible to limit the rotary shaft 1 from moving toward two sides in a thrust direction.

In this state, when the rotary shaft 1 rotates to start the thrust collar 4 rotating, while the thrust collar 4 and the top foil piece 11 rub against each other, an ambient fluid is pushed into a wedge-shaped space formed therebetween. Then, when the rotational speed of the thrust collar 4 reaches a certain speed, a fluid lubrication film is formed therebetween. The pressure of the fluid lubrication film pushes the top foil piece 11 toward the back foil piece 21, and the thrust collar 4 breaks away from the contact state with the top foil piece 11 and starts rotating in non-contact.

As shown in FIG. 4, although the heights H22a of the hill parts 22a of the back foil piece 21 of the present disclosure are constant, since the bottom surfaces 34a of the recesses 34 of the base plate 30, with which the valley parts 22b of the back foil piece 21 come into contact, are inclined at the angle θ, it is possible to apply an appropriate inclination to the top foil piece 11 supported by the back foil piece 21. Thereby, the fluid lubrication film can be formed between the thrust collar 4 and the top foil piece 11.

When the top foil piece 11 is pushed down toward the base plate 30 through the fluid lubrication film, the hill parts 22a of the back foil piece 21 are pushed down toward the base plate 30. At this time, the valley parts 22b of the back foil piece 21 move in the first direction with respect to the attachment position (the attachment part 21b) of the back foil piece 21. In this case, since the valley parts 22b are disposed on the bottom surfaces 34a (inclined surfaces) of the recesses 34, the top foil piece 11 disposed on the back foil piece 21 can be maintained to be inclined. Since the recess 34 is provided with the bottom surface 34a that is wider in the first direction than the valley part 22b, even if the valley part 22b moves in the first direction as described above, the valley part 22b is prevented from contacting the end (a step to the protrusion 33) of the bottom surface 34a.

In this way, when the recesses 34 including the bottom surfaces 34a with inclinations are formed on portions of the base plate 30 with which the valley parts 22b of the back foil piece 21 come into contact, as shown in FIG. 5, inclined surfaces do not have to be formed on the entire area overlapping the back foil piece 21. Therefore, the area of portions (inclined surfaces) that need precision machining is reduced, and the workability of the base plate 30 is improved.

According to the first embodiment described above, when a configuration, in which the plurality of protrusions 33 and the plurality of recesses 34 are provided alternately in the first direction in a striped manner and the bottom surfaces 34a of the plurality of recesses 34 gradually lower toward the one side in the first direction, is adopted, the area of portions that need precision machining can be reduced, and the workability of the base plate 30 can be improved.

Thereby, the time needed for cutting the base plate 30 is decreased, and the cost thereof is reduced. When the area of portions that need precision machining is reduced, as shown in FIG. 6, the press working that is lower-cost than the cutting can be adopted, and the base plate 30 can be easily mass-manufactured.

Second Embodiment

Next, a second embodiment of the present disclosure will be described. In the following description, the same or equivalent components as or to those of the above-described embodiment will be represented by equal reference signs, and the descriptions thereof will be simplified or omitted.

Figure 7:
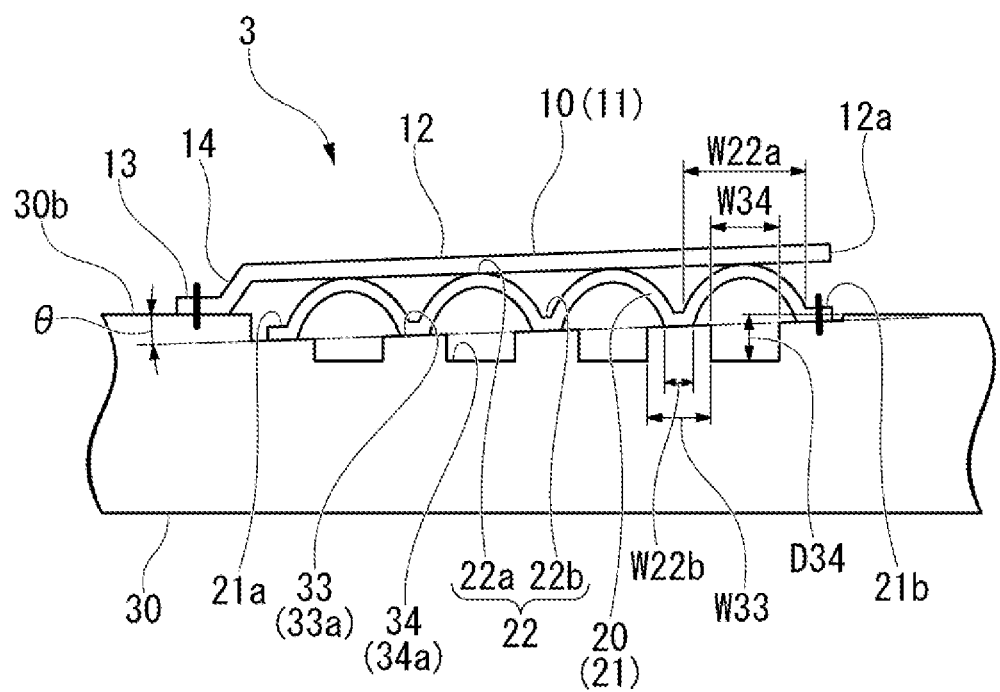
FIG. 7 is a cross-sectional view showing a thrust foil bearing of a second embodiment of the present disclosure.

FIG. 7 is a cross-sectional view showing a thrust foil bearing 3 of the second embodiment of the present disclosure. FIG. 7 shows a portion corresponding to the cross-sectional view shown in FIG. 4 described above.

As shown in FIG. 7, in the second embodiment, top surfaces 33a of a plurality of protrusions 33 formed on a base plate 30 gradually lower toward the one side (left side in FIG. 7) in the first direction.

The protrusions 33 and recesses 34 are formed alternately in the first direction in a striped manner on the base plate. Valley parts 22b of a back foil piece 21 are supported by the top surfaces 33a of the protrusions 33. The top surfaces 33a of the protrusions 33 gradually lower toward the one side (left side in FIG. 7) in the first direction. That is, the top surface 33a of one protrusion 33 is closer to a flat surface 30b than the top surface 33a of another protrusion 33 disposed on the one side in the first direction of the one protrusion 33. The top surfaces 33a of the protrusions 33 of the second embodiment are positioned to be closer to the distant side from the thrust collar than the flat surface 30b of the base plate 30.

The recess 34 formed to have a certain depth (dimension D34) with respect to the flat surface 30b of the base plate 30 is disposed between the protrusions 33 adjacent to each other in the first direction. Each bottom surface 34a of the recesses 34 is formed into a flat surface parallel to the flat surface 30b.

On the other hand, each top surface 33a of the protrusions 33 is formed into an inclined surface that is inclined at an angle θ with respect to the flat surface 30b. The magnitude of the angle θ corresponds to that of the initial inclination angle of an inclined part 12 of a top foil piece 11.

The dimension W33 in the first direction of the protrusion 33 is greater than the dimension W22b in the first direction of the valley part 22b. The dimension W33 of the protrusion 33 may be a dimension such that the valley part 22b is prevented from falling off the top surface 33a of the protrusion 33 even when the valley part 22b moves in the first direction by the back foil piece 21 being pressed against the base plate 30.

The dimension W34 in the first direction of the recess 34 is less than the dimension W22a in the first direction of a hill part 22a. The dimension W34 in the first direction of the recess 34 is set such that the sum of the dimension W34 and the dimension W33 in the first direction of the protrusion 33 corresponds to the interval of the hill parts 22a of the back foil piece 21.

Figure 8:
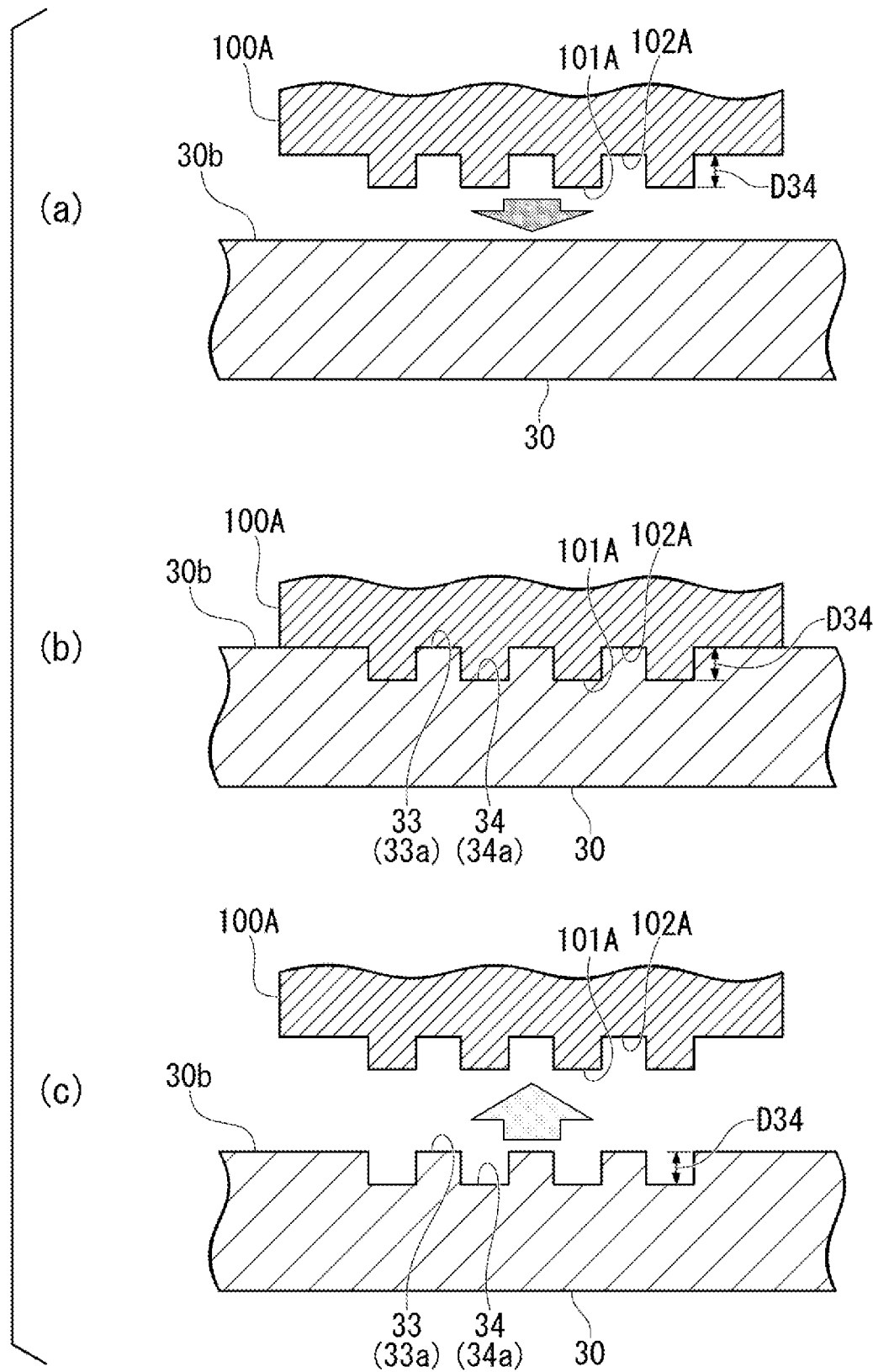
FIG. 8 is a diagram showing a process of forming protrusions and recesses on a base plate of the second embodiment of the present disclosure.
Figure 9:
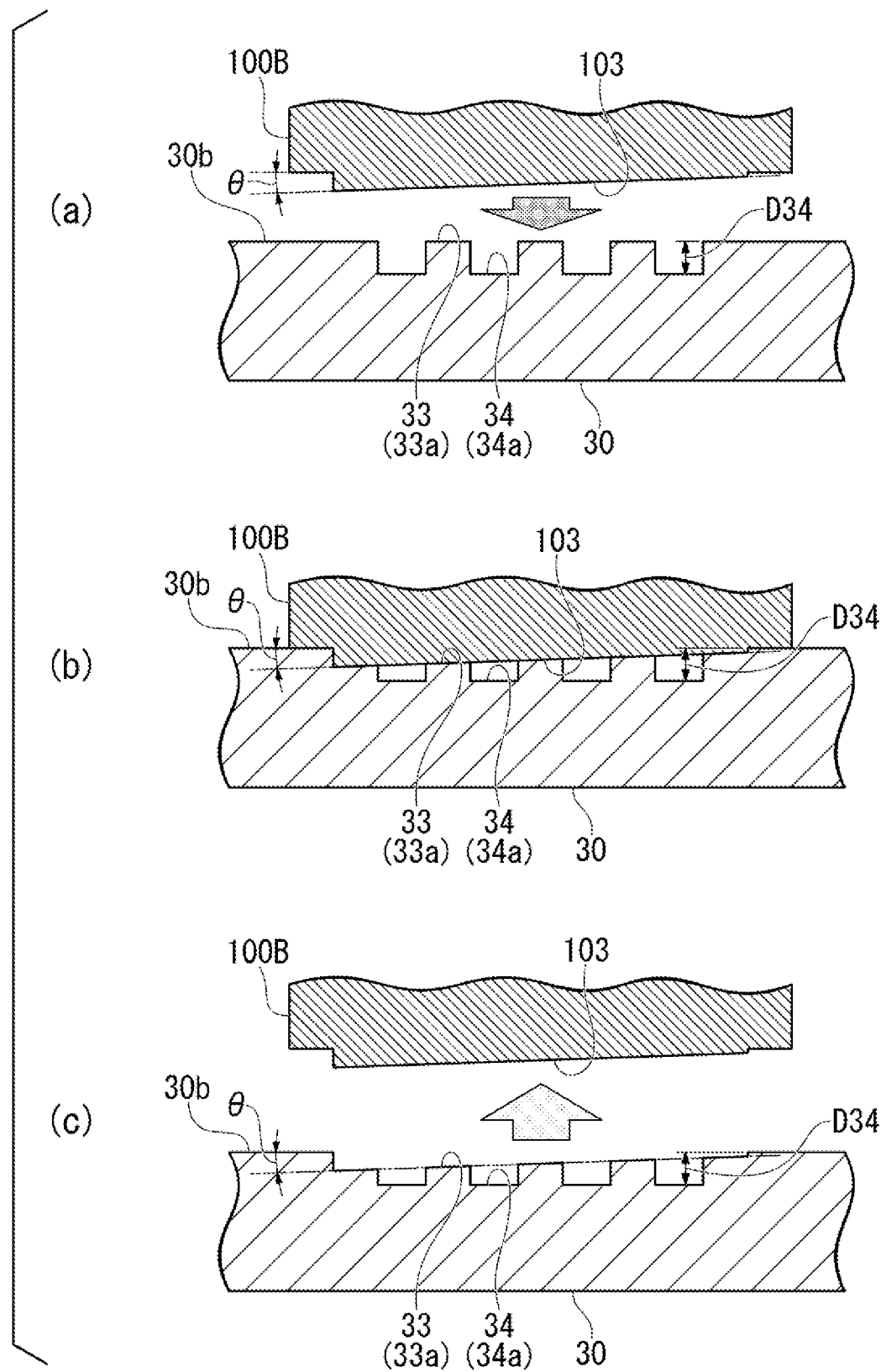
FIG. 9 is a diagram showing a process of forming the protrusions and the recesses on the base plate of the second embodiment of the present disclosure.

The base plate 30 provided with the protrusions 33 and the recesses 34 having the above configurations can be formed through, for example, press working as shown in FIGS. 8 and 9.

FIGS. 8 and 9 are diagrams showing a process of forming the protrusions 33 and the recesses 34 on the base plate 30 of the second embodiment of the present disclosure.

For the press working of this process, a first mold 100A having a press surface provided with recesses and protrusions as shown in FIG. 8 and a second mold 100B having an inclined press surface as shown in FIG. 9 may be used.

As shown in part (a) of FIG. 8, the first mold 100A is provided with a plurality of protrusions 101A and a plurality of recesses 102A disposed alternately in the first direction (the left-right direction in FIG. 8) on the press surface thereof. The facing surfaces of the protrusions 101A are flat surfaces parallel to the flat surface 30b and protrude by the dimension D34 toward the flat surface 30b of the base plate 30. On the other hand, the recesses 102A also include flat surfaces parallel to the flat surface 30b.

As shown in part (b) of FIG. 8, the flat surface 30b of the base plate 30 is pressed using the first mold 100A (first press working). Through the first press working, the shapes of the protrusions 101A and the recesses 102A of the first mold 100A are transferred to the flat surface 30b of the base plate 30 to form the recesses 34 and the protrusions 33 thereon, respectively.

Thereby, as shown in part (c) of FIG. 8, on the flat surface 30b of the base plate 30, the plurality of protrusions 33 having the top surfaces 33a (flat surfaces) included in the same plane as the flat surface 30b, and the plurality of recesses 34 being between the protrusions 33 and including the bottom surfaces 34a (flat surfaces) depressed from the flat surface 30b can be formed.

Next, as shown in part (a) of FIG. 9, the second mold 100B having an inclined press surface is prepared. The second mold 100B is provided, on the press surface thereof, with an inclined part 103 extending toward the flat surface 30b of the base plate 30 and toward the one side (left side in FIG. 9) in the first direction. The facing surface of the inclined part 103 forms an inclined surface of the angle θ. The facing surface of the inclined part 103 has an area that can cover all of the top surfaces 33a of the plurality of protrusions 33.

As shown in part (b) of FIG. 9, an area including the top surfaces 33a of the plurality of protrusions 33 is pressed using the second mold 100B (second press working). Through the second press working, the top surfaces 33a of the plurality of protrusions 33 are crushed and are provided with inclined surfaces obtained by transferring the shape of the inclined part 103 of the second mold 100B thereto.

Thereby, as shown in part (c) of FIG. 9, on the flat surface 30b of the base plate 30, the plurality of protrusions 33 having the top surfaces 33a (inclined surfaces) that are inclined at the angle θ with respect to the flat surface 30b, and the plurality of recesses 34 being between the protrusions 33 and having the bottom surfaces 34a (flat surfaces) not inclined with respect to the flat surface 30b can be formed.

According to the second embodiment having the above configuration, the protrusions 33 having inclinations at the top surfaces 33a are formed on portions of the base plate 30 with which the valley parts 22b of the back foil piece 21 are in contact, and thus similar to the first embodiment, an inclined surface does not have to be formed on the entire area overlapping the back foil piece 21. Therefore, the area of a portion (inclined surface) that needs precision machining is reduced, and the workability of the base plate 30 is improved.

In the second embodiment, as shown in FIG. 8, the plurality of protrusions 33 and the plurality of recesses 34 are formed to decrease the area of the portion that needs precision machining, and thereafter as shown in FIG. 9, inclined surfaces are formed on the top surfaces 33a of the plurality of protrusions 33, and thus the area to be pressed is reduced compared to the first embodiment to make the press working be easier, and the desired precision of the inclined surface of the top surface 33a is easily obtained.

Third Embodiment

Next, a third embodiment of the present disclosure will be described. In the following description, the same or equivalent components as or to those of the above-described embodiments will be represented by equal reference signs, and the descriptions thereof will be simplified or omitted.

Figure 10:
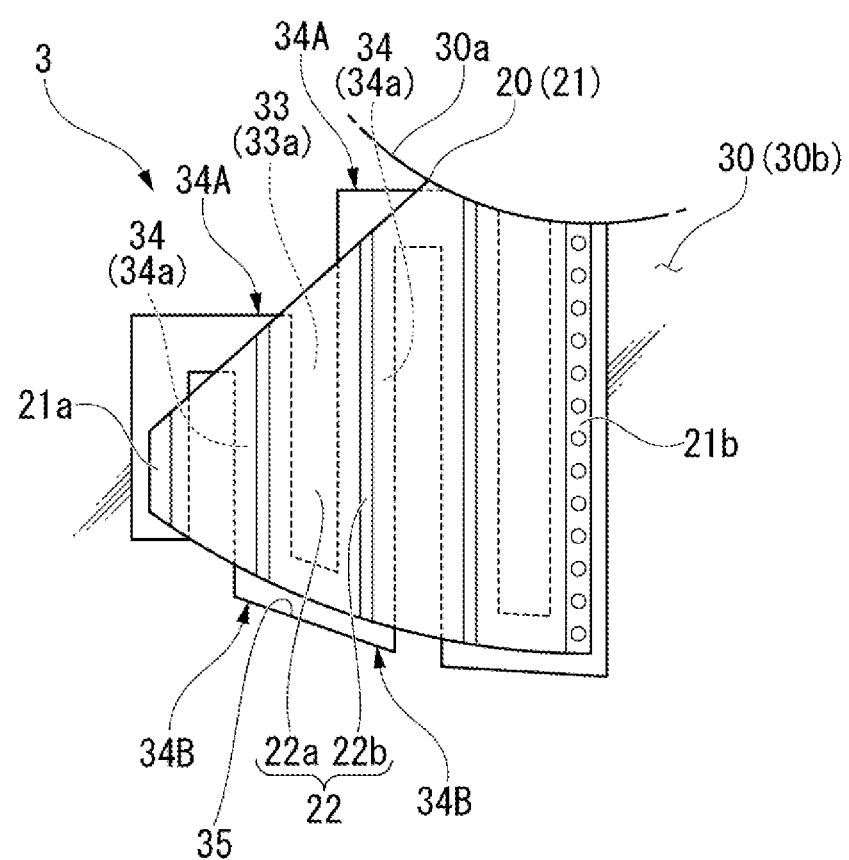
FIG. 10 is a plan view showing a base plate of a third embodiment of the present disclosure.

FIG. 10 is a plan view showing a base plate 30 of the third embodiment of the present disclosure. FIG. 10 shows a portion corresponding to the plan view shown in FIG. 5 described above.

As shown in FIG. 10, in the third embodiment, a plurality of recesses 34 provided in the base plate 30 are connected to each other.

In the third embodiment, similarly to the first embodiment, valley parts 22b of a back foil piece 21 are supported by bottom surfaces 34a of the recesses 34. In the plurality of recesses 34, each pair of recesses 34 adjacent to each other in the first direction are connected to each other alternately through end parts 34A on one side (upper side in FIG. 10) in the second direction and end parts 34B on the other side (lower side in FIG. 10) in the second direction. That is, in the plan view shown in FIG. 10, the recesses 34 as a whole have a zigzag shape that meanders to the one side and the other side in the second direction as it goes in the first direction.

According to the third embodiment having the above configuration, for example, when forming the recesses 34 through cutting, it is possible to continuously cut the recesses 34 in a single stroke without lifting or lowering the cutting tool and to form the inclined surfaces on the bottom surfaces 34a in a short period of time with high accuracy.

As long as the recesses 34 can be continuously cut in a single stroke, the end parts 34A and the end parts 34B do not have to be alternately connected. For example, since the end parts 34A are adjacent to the insertion hole 30a, in a case where the cutting tool passes across the insertion hole 30a (space), ostensibly, the end parts 34A may not be connected together. That is, it is sufficient that either one of the end parts 34A or the end parts 34B in the second direction are connected. The same can apply to a case where the protrusions 33 (or the recesses 34 therearound) are continuously cut in a single stroke.

Hereinbefore, the embodiments of the present disclosure have been described with reference to the drawings, but the present disclosure is not limited to the above embodiments. The various shapes, combinations and the like of the components shown in the above-described embodiments are examples, and various modifications can be adopted based on design requirements and the like within the scope of the present disclosure.

For example, as long as the inclined part 12 of the top foil piece 11 has an inclination, the hill parts 22a of the back foil piece 21 do not have to have a constant height, and the bottom surfaces 34a of the recesses 34 and the top surfaces 33a of the protrusions 33 of the base plate 30, which contact the valley parts 22b of the back foil piece 21, do not have to have inclined surfaces.

INDUSTRIAL APPLICABILITY

When applying the thrust foil bearing of the present application to this field, it is possible to improve the workability of the base plate.

What is claimed is:

1. A thrust foil bearing, comprising:
    a base plate provided with a plurality of protrusions and a plurality of recesses, the plurality of protrusions and the plurality of recesses being formed alternately in a first direction to form strips, and either one of top surfaces of the plurality of protrusions and bottom surfaces of the plurality of recesses lowering toward one side thereof in the first direction; and
    a back foil supported by either one of the top surfaces of the plurality of protrusions and the bottom surfaces of the plurality of recesses of the base plate;
    wherein the surface of the base plate that supports the back foil is the surface that lowers toward the one side in the first direction.

2. The thrust foil bearing according to claim 1, wherein the either one of the top surfaces and the bottom surfaces are formed into an inclined surface.

3. The thrust foil bearing according to claim 1, wherein
    either one of the plurality of protrusions and the plurality of recesses include a portion that extends in a second direction orthogonal to the first direction, and
    protrusions of the plurality of protrusions or recesses of the plurality of recesses, adjacent to each other in the first direction, are connected together at one end by the portion that extends in the second direction.

4. A method of manufacturing a base plate of a thrust foil bearing, the base plate being provided with a plurality of protrusions and a plurality of recesses, the plurality of protrusions and the plurality of recesses being formed alternately in a first direction to form strips, and either one of top surfaces of the plurality of protrusions and bottom surfaces of the plurality of recesses lowering toward one side in the first direction, the method comprising:
    forming the plurality of protrusions and the plurality of recesses through press working.

5. The method of manufacturing a base plate of a thrust foil bearing according to claim 4, wherein
    the press working includes:
        a first press working in which the base plate is pressed by a first mold provided with recesses and protrusions on a press surface to form the plurality of recesses and the plurality of protrusions, the top surfaces of the plurality of protrusions having a constant height, and
        a second press working in which after the first press working, the top surfaces of the plurality of protrusions are pressed by a second mold including an inclined press surface to form inclined surfaces lowering toward the one side in the first direction.

* * * * *